(12) United States Patent
Seto et al.

(10) Patent No.: US 6,267,513 B1
(45) Date of Patent: Jul. 31, 2001

(54) FAIL-SAFE OPTICAL CONNECTOR

(75) Inventors: Masashi Seto, Zama; Kenji Watanabe, Atsugi, both of (JP)

(73) Assignees: Molex Incorporated, Lisle, IL (US); Sony Corporation, Tokyo (JP)

( * ) Notice: Subject to any disclaimer, the term of this patent is extended or adjusted under 35 U.S.C. 154(b) by 0 days.

(21) Appl. No.: 09/438,570

(22) Filed: Nov. 10, 1999

(30) Foreign Application Priority Data

Nov. 10, 1998 (JP) .................................................. 10-334926

(51) Int. Cl.[7] ...................................................... G02B 6/38
(52) U.S. Cl. ................................................................. 385/56
(58) Field of Search .......................... 385/55–56, 88–89; 439/353, 545, 215, 77, 567; 347/50

(56) References Cited

U.S. PATENT DOCUMENTS

| | | | |
|---|---|---|---|
| 4,669,797 | * | 6/1987 | Bourdon ................................ 439/353 |
| 4,678,264 | * | 7/1987 | Bowen et al. ........................... 385/88 |
| 4,761,144 | * | 8/1988 | Hunt et al. ............................. 439/545 |
| 5,203,712 | * | 4/1993 | Kilpatrick et al. .................... 439/215 |
| 5,447,442 | * | 9/1995 | Swart ...................................... 439/77 |
| 5,490,800 | * | 2/1996 | Benes et al. ........................... 439/567 |

\* cited by examiner

*Primary Examiner*—Akm E. Ullah
(74) *Attorney, Agent, or Firm*—A. A. Tirva

(57) ABSTRACT

Disclosed is a fail-safe optical connector including a plug having an engagement portion and a receptacle for mating with the plug. The receptacle has a resilient latch for coupling with the engagement portion of the plug. The plug has a cover slidably mounted thereon with at least one actuating piece formed on its front side. The actuating piece has a trapezoidal projection formed on its free end. The trapezoidal projection abuts the engagement projection of the latch to disengage it from the engagement portion of the plug when the cover moves backward. The plug has at least one latch projection formed on either side of the front end adapted to mate with and aperture in a yieldable wall on the receptacle.

3 Claims, 6 Drawing Sheets

3

FAIL-SAFE OPTICAL CONNECTOR

BACKGROUND OF THE INVENTION

The present invention relates to an optical connector for making a required connection between two optical fibers or between an optical fiber and an associated optical device.

PRIOR ART

This type of optical connector includes a plug and a receptacle to be mated with the plug. To keep these parts in the mated condition, the receptacle has a resilient engagement latch formed thereon whereas the plug has a recess or aperture made therein for engaging a projection on the resilient engagement latch of the receptacle.

A conventional optical connector is designed such that the plug can be separated from the receptacle without use of tools, for example, the plug has a slidable cover attached thereto, which when pushed towards the receptacle abuts the resilient engagement latch of the receptacle and raises it from the recess of the plug thereby permitting the plug to be disengaged from the receptacle.

While advantageously no extra tool is required in decoupling the plug from the receptacle, there are some problems with such arrangement. If the cover is moved backward inadvertently, undesired decoupling may occur. To overcome this problem, springs are inserted between several selected parts to prevent optically unstable conditions, but this arrangement increases the number of parts to be assembled and accordingly the number of assembly steps.

SUMMARY OF THE INVENTION

In view of the above one object of the present invention is to provide a fail-safe optical connector of simple structure, requiring no extra tools for decoupling, no springs, fewer number of parts to be assembled, and yet ensuring complete, stable plug-and-receptacle coupling all the time.

To attain this object a fail-safe optical connector according to the present invention includes a plug having a slidable cover enclosing the plug, which cover may be moved forward to abut against the resilient engagement latch of the receptacle for decoupling; and a receptacle with engagement projections which yield to allow the latch projections on the plug housing to be engaged by the recesses or apertures in the yielding sides of the receptacle.

Specifically, an optical connector having a plug with an engagement projections formed thereon and a receptacle to be mated with the plug having a resilient engagement latch formed therein for coupling with the engagement portion of the plug when the receptacle accommodates the plug, is improved according to the present invention in that the plug has a cover slidably attached thereon, the cover having at least one actuating piece formed on its front side to be inserted in a space defined by the surrounding wall of the receptacle. The actuating piece has a trapezoidal projection formed on its free end allowing the projection to abut the engagement projection of the resilient engagement latch for raising and disengaging it from the engagement portion of the plug when the cover is moved backward on the plug. Additionally, that the plug has at least one latch projection formed on either side of its front end whereas the receptacle has a projection formed on the surrounding yieldable wall with an aperture in the wall, whereby the wall in response to the insertion of the plug into the receptacle yields so that the latch projection on the plug may be engaged by the aperture of the yieldable wall allowing the wall to return to the stress-free, original position, thereby preventing undesired decoupling between the plug and the receptacle even if the cover is inadvertently moved back from the receptacle and the engagement latch is released.

With this arrangement the plug and the receptacle are mated together with the engagement portion of the plug engaged by the resilient engagement latch of the receptacle, and with the latch projection on the plug engaged by the aperture of the yieldable wall of the receptacle. Thus, the plug and the receptacle are double-latched. Withdrawal of the cover causes the trapezoid projection of the actuating piece to lift the resilient engagement latch such that the plug is placed in half-disconnected position from the receptacle, and further withdrawal of the cover causes the latch projection to leave the aperture of yielding wall resulting in complete disconnection of the plug from the receptacle. No extra tool is required for decoupling the plug from the receptacle. Still advantageously, even if the cover is inadvertently pulled back from the receptacle, the latch projection on the plug remains engaged by the aperture of the yieldable wall of receptacle, preventing undesired disconnection between the plug and the receptacle.

The yieldable surrounding wall of the receptacle has a tapered surface formed inside defining a divergent space toward the plug. This has the effect of causing no sequential sound feedback (clicks) during the coupling of the plug with the receptacle thereby preventing a person handling the optical connector from mistaking the first click for the sign of complete engagement. Such a mistake may be caused by failure to continue the mating process until the second click is heard. Specifically, the tapered surface of the projection on the yieldable wall of the receptacle will cause the resistance to insertion of the plug to increase continuously until the plug has reached the final coupling position. At that time the person feels a counter action on the plug as a sign of complete coupling. If the projection had a linear flat surface, he would hear the first click which would be caused when the yieldingly upward-bending of the resilient engagement piece of the receptacle stops with the first click but before the outward-yielding of the projection on the receptacle starts as a counter action to abutment on the bondable extension by latch projection of the plug and he would stop the further mating process of the plug prior to the complete coupling. Thus, he would mistake incomplete coupling for complete coupling based on the first click, leaving the plug and receptacle only partially coupled. This is avoided in the fail-safe optical connector according to the present invention.

Other objects and advantages will be understood from the following description of a fail-safe optical connector according to one preferred embodiment of the present invention, which is shown in accompanying drawings.

DESCRIPTION OF PREFERRED EMBODIMENTS

Figure 1:
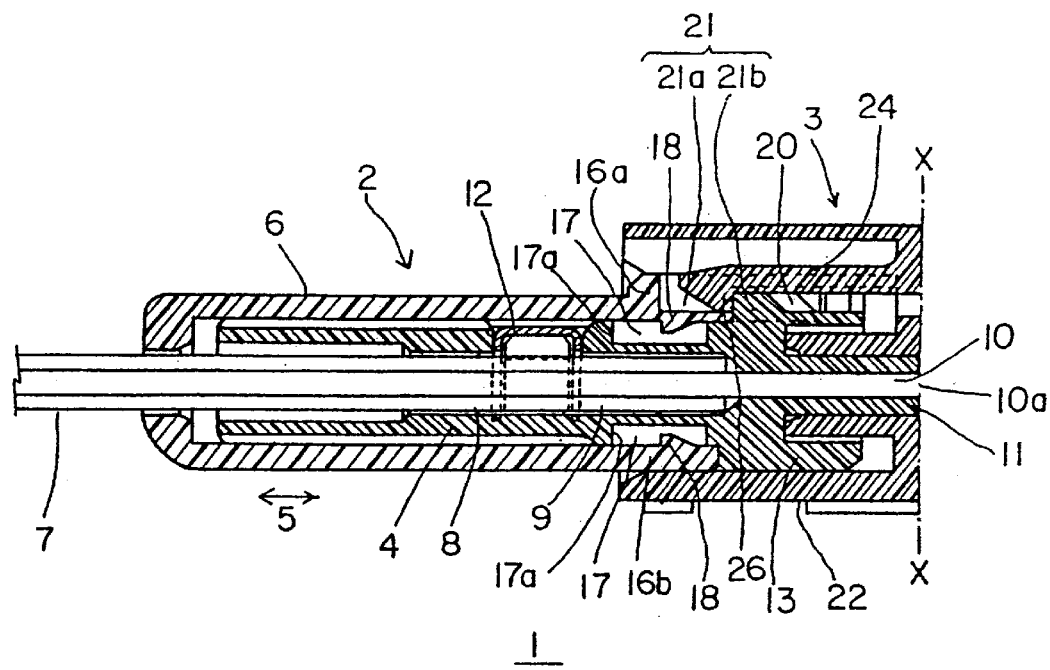
FIG. 1 is a longitudinal cross section of the optical connector in a mated condition.

A fail-safe optical connector 1 includes a plug 2 and a receptacle 3. FIG. 1 shows the optical connector with plug and receptacle mated, whereas FIG. 2 shows the optical connector in the process of decoupling the plug 2 from the receptacle 3.

Figure 3:
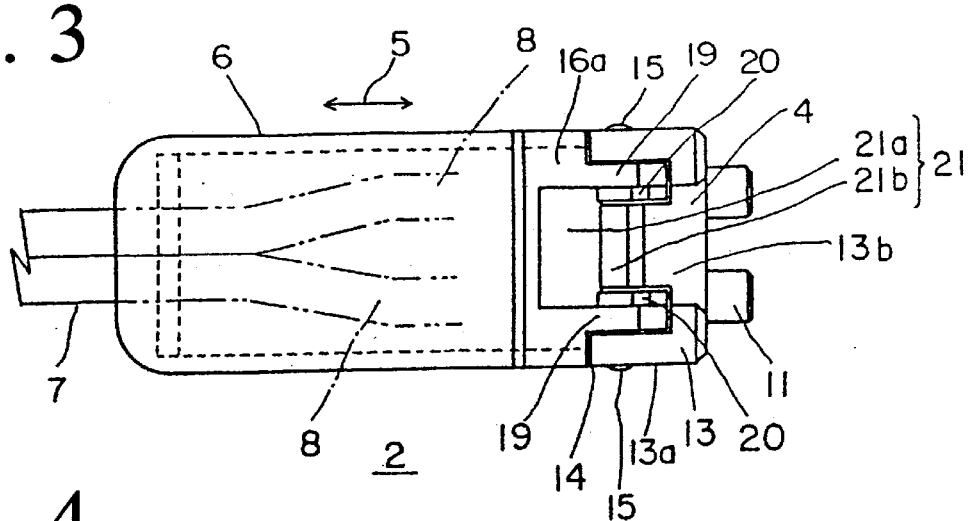
FIG.3 a plan view of the plug of the optical connector.
Figure 4:
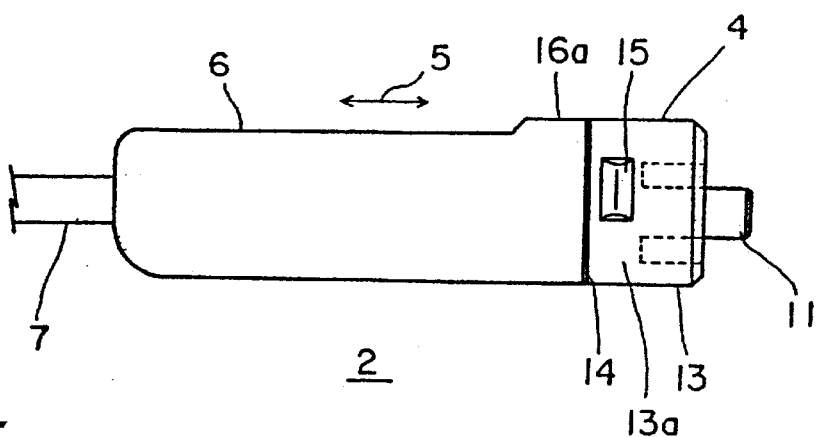
FIG. 4 is a side view of the plug.
Figure 5:
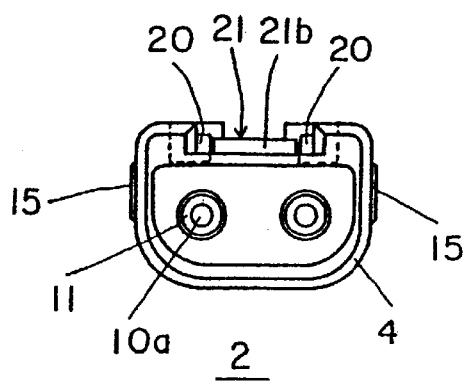
FIG. 5 is a front end view of the plug.

Referring now to FIGS. 3 to 5, the plug 2 has a plug housing 4 and a cover 6 slidably mounted on the plug housing 4. The cover 6 has an opening in its front side, and a passage in its back side. The cover 6 may be moved back and forth as indicated by a double-headed arrows in FIGS. 3 and 4. An optical fiber cable 7 passes through the passage in the back end of the cover 6 and is separated into individual core fibers 8 (see FIG. 3). The stripped ends 10 of the core fibers 8 are inserted into the cylindrical projections 11 of the front end 13 of the plug housing 4 allowing the ends 10a of the core fibers to be exposed at the ends of the cylindrical projections 11. Cable retainers 12, shown in FIG. 1, are slidably mounted in slots in the plug housing 4 cutting in the sheath 9 surrounding the core fibers 8 thereby securing the core fibers 8 in the plug housing 4. The cable retainers 12 are mounted under the cover 6, and additionally help to maintain the cover on the plug housing 4.

The front end portion 13 of the plug housing 4 is larger in cross section than the rear portion forming an annular stepped boundary 14 at the rear-to-front transition, which annular stepped boundary 14 functions as a stop for the cover 6. The cover 6 is flush with the front end 13 of the plug housing 4, and the plug housing 4 has triangular ridge- like latch projections 15 formed on the opposite sides 13a of the end 13 of the plug housing 4.

Figure 2:
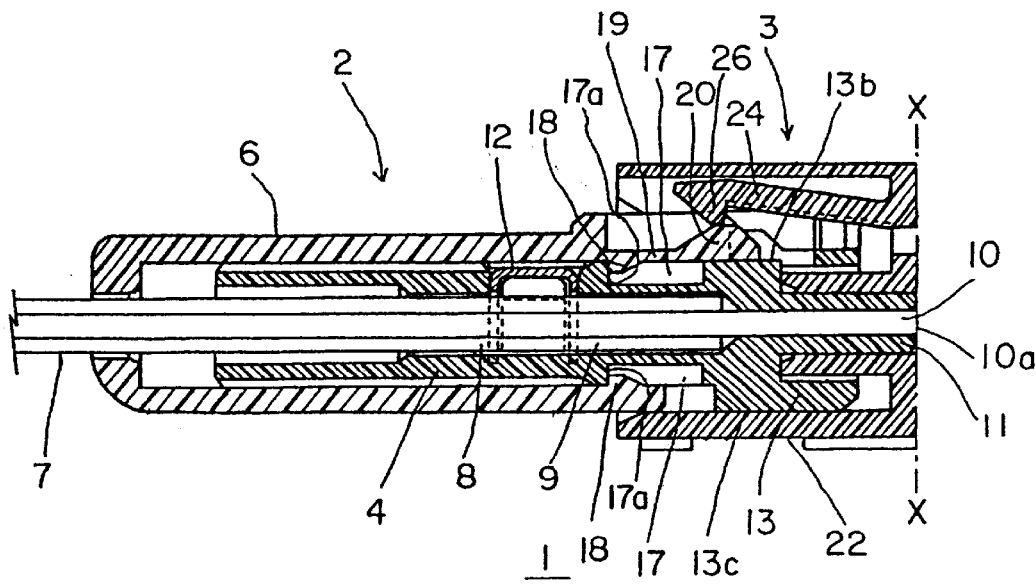
FIG. 2 is a longitudinal section of the optical connector in a partially mated condition.

As seen from FIGS. 1 and 2, the cover 6 has ramp projections 18 formed on the ceiling 16a and bottom 16b on its front side, and the plug housing 4 has recesses 17 on the upper and lower surfaces 13b and 13c on its front side. The cover 6 is slidably mounted on the plug housing 4 with the ramp projections 18 within the recesses 17 limiting the backward movement of the cover 6 on the plug housing 4 to the position in which the ramp projections 18 abut against the rear walls 17a of the recesses 17 (see FIG. 2).

The cover 6 has a pair of actuating pieces 19 formed on its front (see FIG. 3), extending over the upper surface 13b of the front portion 13 of the plug housing 4. Each actuating piece 19 has a trapezoidal projection 20 formed inside on its free end (see FIGS. 2 and 3), and the front portion 13 of the plug housing 4 has a stepped engagement portion 21 formed on its upper surface 13b, the stepped engagement portion 21 being composed of a lower surface 21a and an upper surface 21b (see FIG. 1).

Referring to FIGS. 6 to 10, the receptacle 3 has a box-like compartment 22 for accommodating the front portion 13 of the plug 2. The receptacle 3 additionally has a compartment 23 communicating with the box-like compartment 22. As another example of receptacle, two receptacles are arranged side by side symmetrically with respect to the line X—X in FIGS. 1 and 2, and the arranged receptacles are integrally connected together to provide a dual receptacle openings on its opposite sides for accommodating mating plugs.

The receptacle 3 has a resilient cantilever-like engagement portion 24 formed therein (see FIGS. 1 and 2). The cantilever-like engagement portion 24 has a hook-like projection 26 formed on its free end. The projection 26 of the cantilever-like engagement portion 24 is engaged by the stepped engagement projection 21 on the front portion of the plug housing 4 when the receptacle 3 accommodates the plug 2. The cantilever-like engagement portion 24 is somewhat broader than the stepwise engagement projection 21, thus permitting the opposite sides of the cantilever-like engagement portion 24 to contact the trapezoidal projections 20 of the actuating pieces 19.

Figure 6:
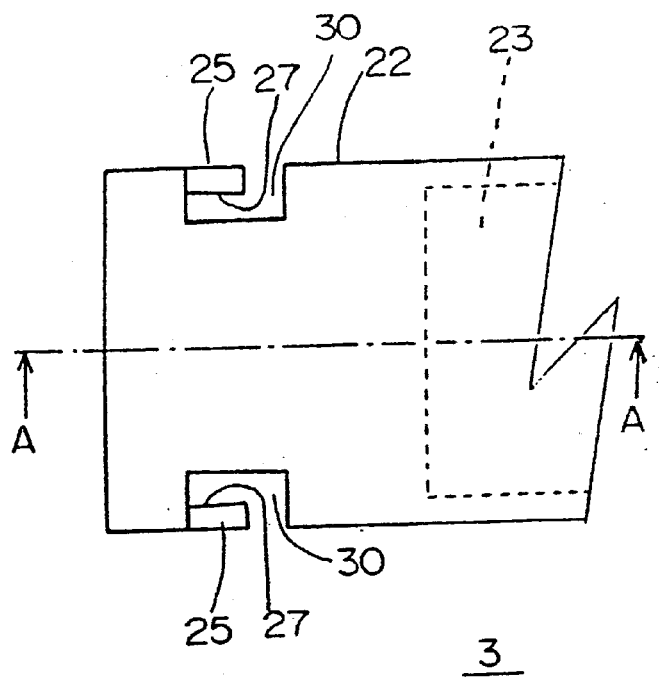
FIG. 6 a plan partial view of the receptacle of the optical connector.
Figure 7:
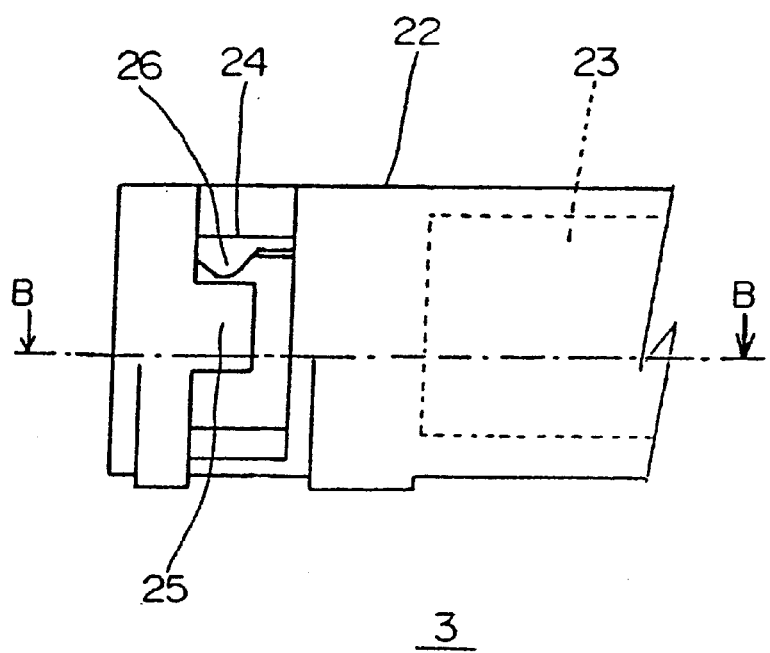
FIG. 7 is a partial side view of the receptacle.
Figure 8:
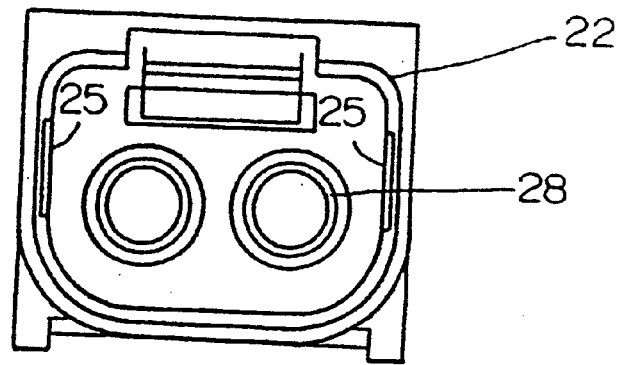
FIG. 8 is a front end view of the receptacle.
Figure 9:
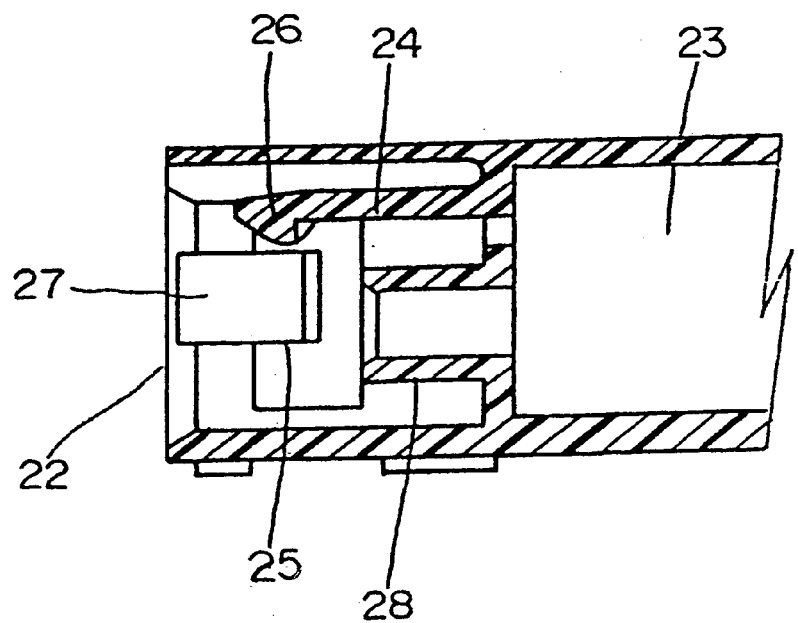
FIG. 9 is a sectional view of the receptacle taken along line A—A in FIG. 6.
Figure 10:
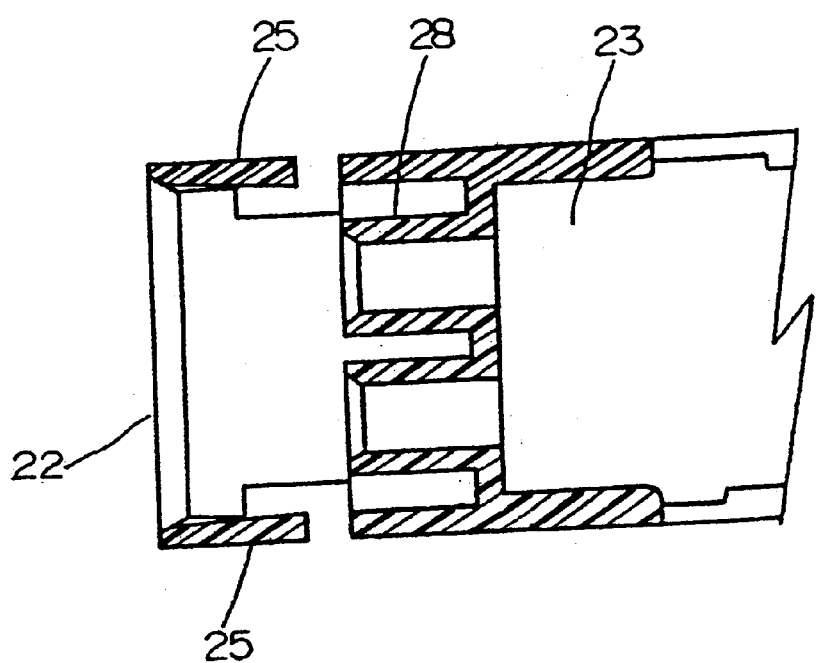
FIG. 10 is a sectional view of the receptacle taken along line B—B in FIG. 7.
Figure 11:
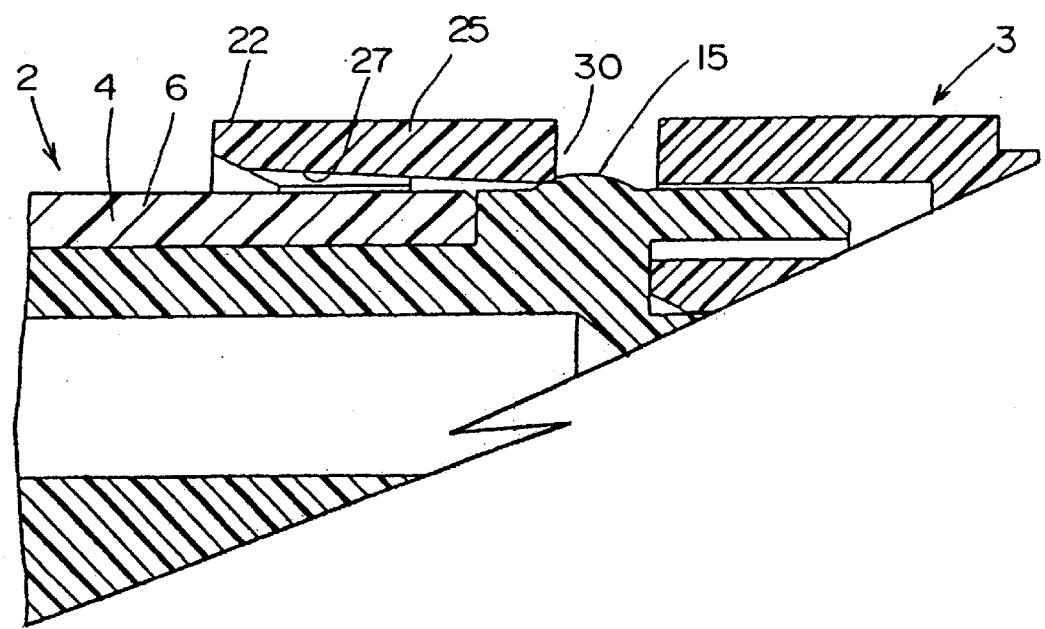
FIG. 11 is an enlarged fragmentary section of the plug and receptacle, showing how the latch projection of the plug housing is engaged by the aperture of the receptacle.

The receptacle 3 also includes projections 25 formed in its deformable side walls (see FIGS. 6 and 7. The projections 25 engage the triangular ridge-like latch projections 15, which are formed on the opposite sides 13a of the front end 13 of the plug housing 4, as described earlier. Each projection 25 has a tapered surface 27 formed inside, thereby defining a divergent space toward the plug 2, as may be best seen in FIG. 11.

The receptacle 3 has two cylindrical apertures 28 in the bottom of the box-like space for snugly accommodating the cylindrical projections 11 of the plug housing 4, thereby allowing the ends 10a of the optical fibers 10 to be located in proper positions when the plug 2 and the receptacle 3 are mated together.

When mating, the plug 2 with the receptacle 3, the plug 2 with the cover 6 in the forward position is inserted in the box-like compartment of the receptacle 3. When the front portion of the plug 2 is moved forward in the box-like compartment it forces the cantilever-like engagement portion 24 to be moved up by the ramp 21b of the stepped engagement projection 21 and at the same time engage the projections 25 by the triangular ridge-like latch projections 15. The tapered surface of each projection 25 has the effect of facilitating the entrance of the plug 2 and reduces the wear of the inner surface of the projections 25 which wear would be caused by increased friction. The hook-like projection 26 rides over the the ramp 21b of the stepped engagement projection 21 and at the same time passes over the triangular ridge-like latch projections 15. The hook-like projection 26 engages the stepped engagement projection 21 and the triangular ridge-like latch projections 15 are engaged by the apertures 30 located in receptacle 3 next to the projections 25 (see FIG. 11).

Thus, the plug 2 and the receptacle 3 are coupled together (see FIG. 1), keeping the optical fiber 10 in mated position with the help of both engagement of the resilient cantilever-like engagement portion 24 with the stepped engagement projection 21 and engagement of the triangular ridge-like latch projections 15 with the apertures 30 of the receptacle 3.

In decoupling the plug 2 from the receptacle 3, the cover 6 is moved backward on the plug housing 4, and the plug housing 4 is pulled apart from the receptacle 3 while the stop projections 18 of the cover 6 abut against the rear walls 1–7a of the recesses 17 of the plug housing 4. Specifically, the backward movement of the cover 6 causes the trapezoidal projections 20 of the actuating pieces 19 of the cover 6 to move under the hook-like projection 26 of the cantilever-like engagement projection 24 (see FIG. 2), thereby raising the cantilever-like engagement portion 24 to disengage the stepped engagement projection 21 from the hook-like projection 26 of the cantilever-like engagement portion 24. Sequentially, the cover 6 is pulled back to move the plug housing 4 apart from the receptacle 3. Then, the plug housing 4 exits the receptacle 3 by allowing the latch projections 15 to move projections 25 outward for disengagement.

Assuming that the cover 6 may be inadvertently moved back when the plug-and-receptacle are in a mated condition and that the cantilever-like engagement piece 24 is decoupled from the stepped engagement projection 21, the latch projections 15 still remains in apertures 30 and in contact with projections 25 preventing the plug 2 from leaving the receptacle 3. Consequently, the ends 10a of the optical fibers 10 remain in their predetermined locations.

We claim:

1. An optical connector comprising, a plug having a dielectric housing with a front end incorporating top, bottom and two opposed side walls, a receptacle adapted for mating with the plug, the receptacle having a dielectric housing including an opening defined by top, bottom and two opposed sidewalls for accommodating the front end of the plug, the receptacle having a resilient, cantilevered latch portion extending into the opening, the latch portion having a hook like projection formed on its free end for engaging a latching portion located on the plug to latch the plug and receptacle together, the receptacle side walls including two opposed openings located a predetermined distance inside the receptacle opening, which side wall openings allow the portions of the sidewalls preceding the side wall openings to expand when the front portion of the plug with at least one latch projection located on one of its side wall enters the receptacle opening thereby allowing the front end of the plug to continue to move inside the receptacle opening until the projection enters opening allowing the side walls to move back from their expanded position to their normal position securing the projection within the opening thereby providing a second latching arrangement for latching the plug and receptacle together, a cover slidably mounted on the plug housing, the cover having at least one actuating piece extending from one of its ends, the actuating piece having a trapezoidal projection formed on its free end, wherein the trapezoidal projection is also engaged by the hook like projection of the latch portion when the cover is in its most forward position, and wherein the movement of the cover backward disengages the projection from the latching portion, however the plug and receptacle are still latched together by the secondary latching arrangement.

2. An optical connector in accordance with claim 1, wherein the movable portion of the receptacle side wall has a tapered surface formed on the inside portion of the wall, the tapered surface defining a divergent angle towards the entrance of the opening.

3. An optical connector in accordance with claim 1, wherein the opening in the receptacle sidewall extends substantially the entire height of the side wall.

* * * * *